US006985667B2

(12) United States Patent
Arishima et al.

(10) Patent No.: US 6,985,667 B2
(45) Date of Patent: Jan. 10, 2006

(54) OPTICAL FIBER COMPONENT FOR CONNECTION AND MANUFACTURING METHOD THEREOF

(75) Inventors: Koichi Arishima, Mito (JP); Takashi Yoshida, Mito (JP); Mamoru Hirayama, Iwama-machi (JP); Shin Sumida, Tsukuba (JP)

(73) Assignees: NTT Electronics Corporation, Tokyo (JP); Nippon Telegraph and Telephone Corporation, Tokyo (JP)

( * ) Notice: Subject to any disclaimer, the term of this patent is extended or adjusted under 35 U.S.C. 154(b) by 277 days.

(21) Appl. No.: 10/100,168

(22) Filed: Mar. 19, 2002

(65) Prior Publication Data

US 2002/0174691 A1 Nov. 28, 2002

(30) Foreign Application Priority Data

Mar. 21, 2001 (JP) ............................. 2001-081539

(51) Int. Cl.
G02B 6/00 (2006.01)
G02B 6/08 (2006.01)
G02B 6/44 (2006.01)

(52) U.S. Cl. .................... 385/137; 385/49; 385/99; 65/409

(58) Field of Classification Search .............. 385/49, 385/99, 114, 120, 137; 65/409
See application file for complete search history.

(56) References Cited

U.S. PATENT DOCUMENTS

| 4,355,865 | A | * | 10/1982 | Conrad et al. ............ 385/114 |
| 4,498,732 | A | * | 2/1985 | Campbell et al. .......... 385/135 |
| 5,282,236 | A | * | 1/1994 | Hayes et al. ............. 378/182 |
| 5,292,390 | A | | 3/1994 | Burack et al. |
| 5,611,017 | A | * | 3/1997 | Lee et al. ................ 385/114 |
| 5,878,179 | A | * | 3/1999 | Schricker ................ 385/100 |
| 5,917,180 | A | * | 6/1999 | Reimer et al. .......... 250/227.14 |
| 6,272,263 | B1 | * | 8/2001 | Schricker ................ 385/14 |
| 6,650,821 | B1 | * | 11/2003 | Koyano et al. .......... 385/136 |
| 2002/0090191 | A1 | * | 7/2002 | Sorosiak ................ 385/137 |

FOREIGN PATENT DOCUMENTS

| EP | 0 816 882 A2 | | 1/1998 |
| JP | 06230248 A | * | 8/1994 |
| JP | 10-68853 A | | 3/1998 |
| JP | 2000329948 A | * | 11/2000 |
| JP | 2000352626 A | | 12/2000 |

OTHER PUBLICATIONS

11119034, Patent Abstracts of Japan, Apr. 30, 1999.
Official Notice of Rejection—Patent Appln No. 2001-081539, mailing date: Dec. 3, 2004; Case No. NEL00158.

* cited by examiner

Primary Examiner—Michelle R. Connelly-Cushwa
(74) Attorney, Agent, or Firm—Marina V. Schneller; Venable LLP

(57) ABSTRACT

This invention provides an optical fiber wiring board having excellent optical property, high reliability and high mounting property. This invention relates to an optical fiber component for connection having a substrate on which a plurality of optical fibers being wired, wherein a foam polymer layer is provided on a surface of the substrate wiring the optical fibers, or both on a surface of the substrate wiring the optical fibers and on a surface opposite to the surface of the substrate wiring the optical fibers, or so that whole of substrate is covered. The optical fiber component of the present invention may be further provided with a protective layer and may be filled with a filler. This invention provides also a manufacturing method of the optical fiber component for connection.

18 Claims, 8 Drawing Sheets

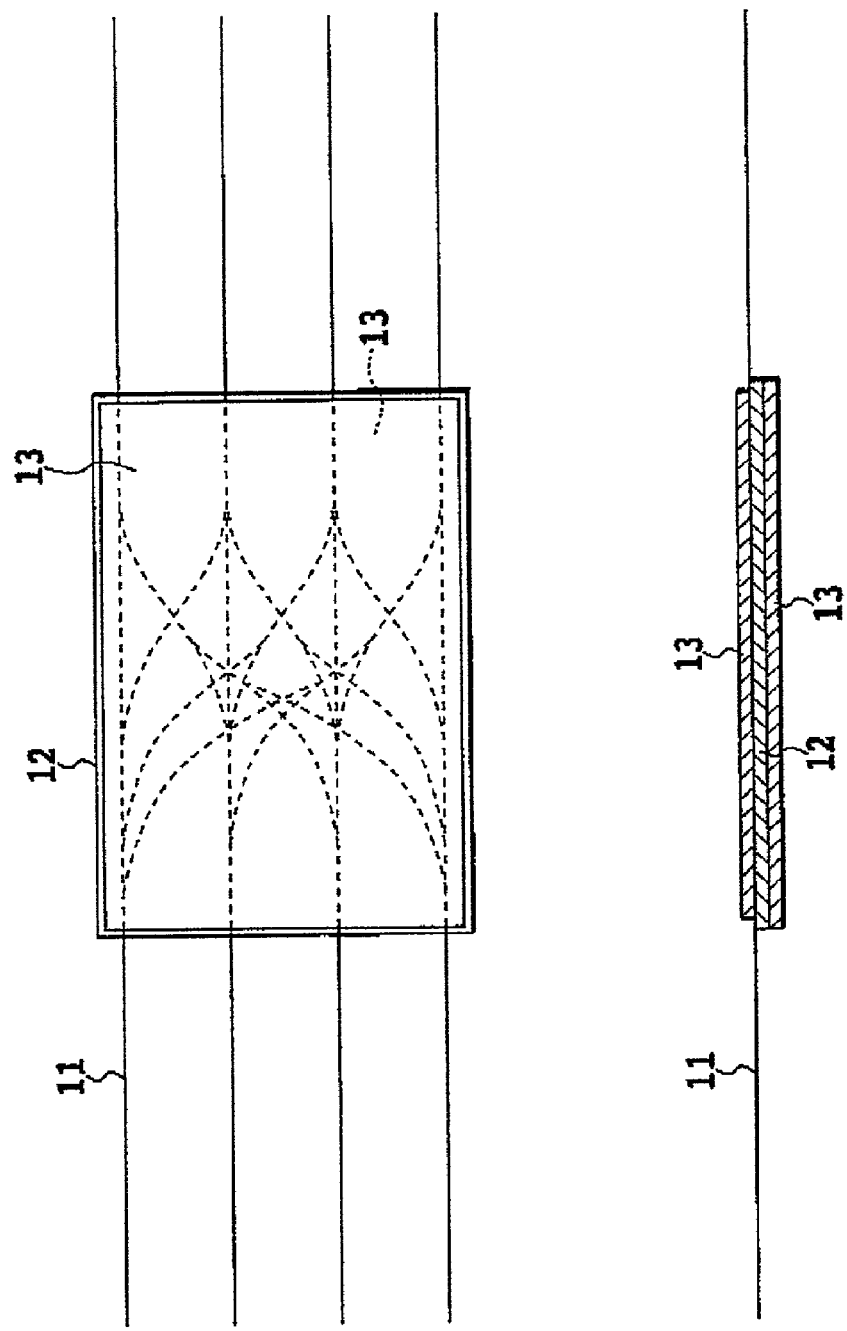

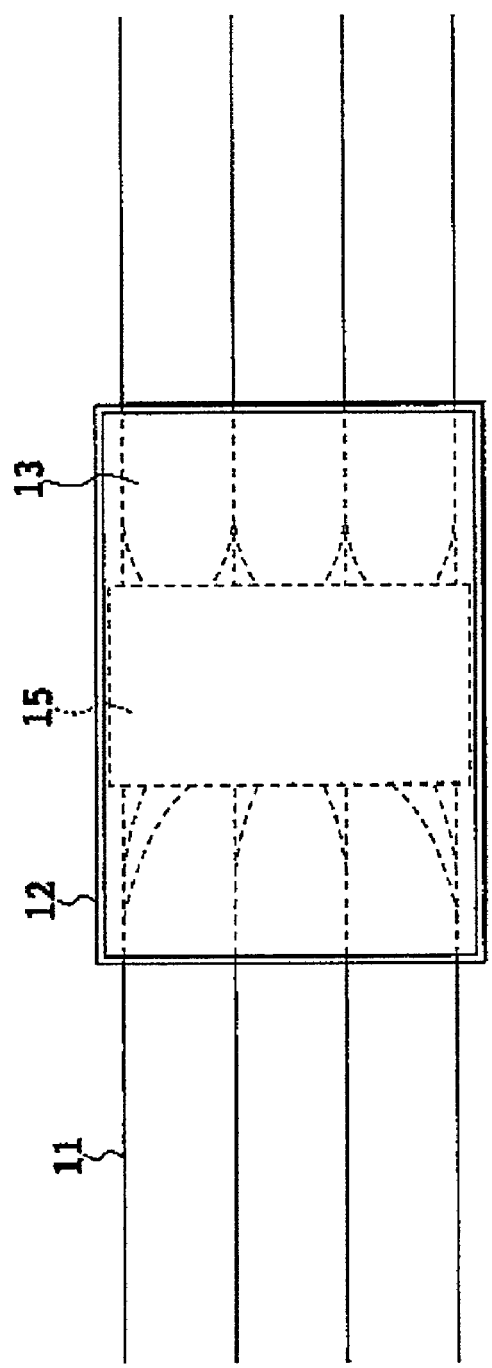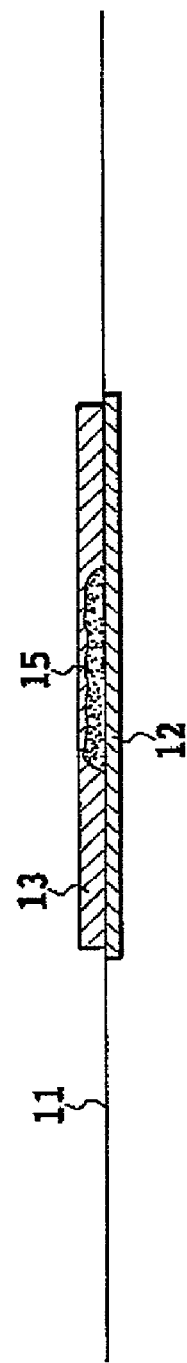
FIG.4A
FIG.4B

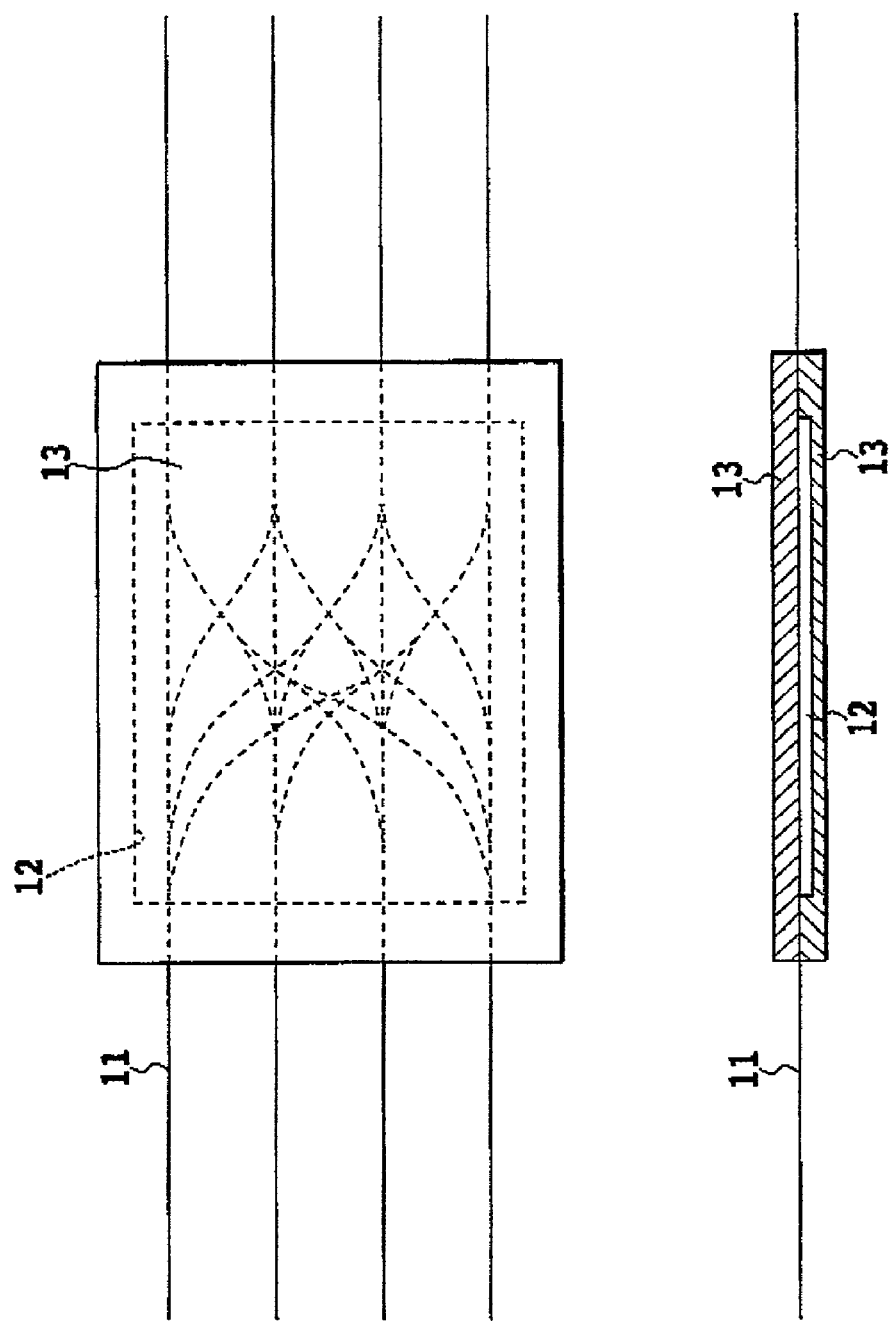

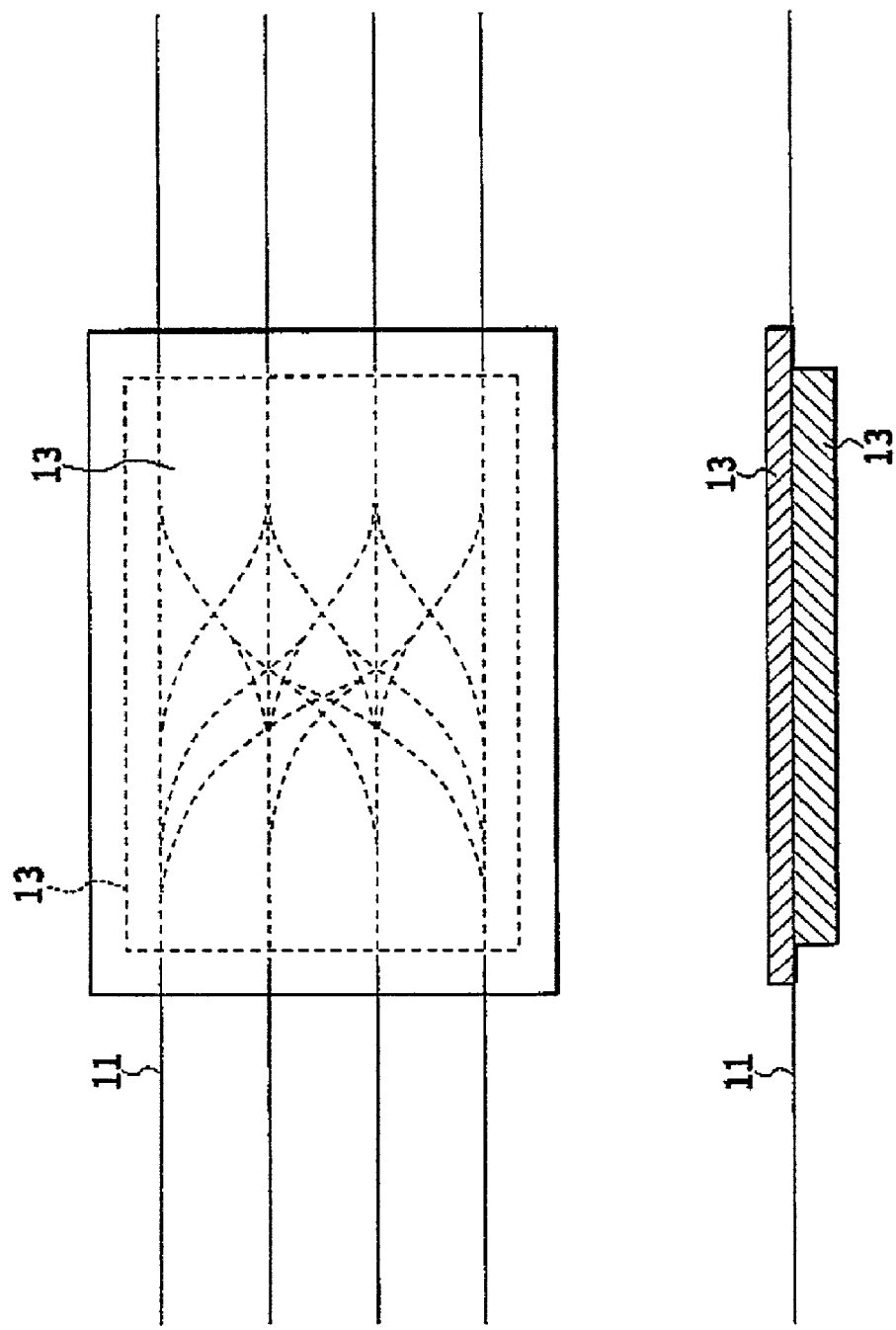

OPTICAL FIBER COMPONENT FOR CONNECTION AND MANUFACTURING METHOD THEREOF

This application is based on Patent Application No. 2001-81539 filed Mar. 21, 2001 in Japan, the content of which is incorporated hereinto by reference.

BACKGROUND OF THE INVENTION

1. Field of the Invention

The present invention relates to an optical fiber component for connecting efficiently and correctly between optical components, between optical boards, and between optical racks using optical fibers.

2. Description of the Related Art

Various types have so far been proposed for optical fiber components for connection (hereinafter referred to also as an optical fiber wiring board) connecting between optical components, between optical boards, and between racks. Optical fiber wiring boards, in which optical fibers are arranged on a substrate, such as a flexible resin film, according to predesigned patterns are mainly used. Moreover, as optical fiber wiring boards, on which optical fibers are laid and then fixed, those having structures as a sandwiched type in which optical fibers are sandwiched between substrates or between films, and an embedded type in which optical fibers arranged on a substrate are embedded in a thermoplastic resin have been proposed.

The above described sandwiched type optical fiber wiring board has the following problem: when the wiring board is bent, since a force is exerted in a direction to shrink a substrate or a film in the inside of the bent portion and a force is exerted in a direction to elongate it in the outside, the substrate or film sandwiching optical fibers has lager resistance to bending, and the wiring board is thus hard to be bent. Moreover, in an optical fiber wiring of a sandwiched type, upon such bending, a stress is also exerted on optical fibers which was attributable to an increase in optical loss.

For the above described embedding type optical fiber wiring board, optical fibers are fixed by curing a thermoplastic resin. A problem occurred that a stress was given to the optical fibers at the time of this curing process. Furthermore, there were such disadvantages that transmitted light intensity easily varied according to changes in temperature and flexibility to bending of a wiring board was insufficient. Moreover, some thermoplastic resins used in the embedding type optical fiber wiring board have weak mechanical strength, and there is a need for improving such mechanical characteristics. In addition, when an embedding type optical fiber wiring board has a structure in which optical fibers are completely embedded, weight of a resin itself becomes large (for example, an optical fiber wiring board with a size of 210 mm×297 mm (A4-size) and a thickness of 2 mm may weigh about 120 g), and it is therefore required to consider a stopper for supporting the weight and prevention of bending by self-weight.

In addition, an optical fiber wiring board might be used for wiring in a limited space and is also assumed to be installed in the state of being bent at the time of mounting. Therefore, an increase in optical loss and a decrease in flexibility upon bending pose a big problem. Moreover, in wiring between boards, an optical fiber wiring board is installed on the outside of a rack containing the optical board to connect the boards, and therefore, the optical fiber wiring board is also assumed to be accidentally hooked or pushed during work. In such a case, a poor mechanical property poses a problem. Moreover, when a large-scaled optical fiber wiring board for wiring between racks or wiring between boards is manufactured using embedding type optical fiber wiring boards, the wiring board becomes heavy to cause problems in mounting.

These problems are important and must be solved in the optical characteristics, reliability, and mounting property of an optical fiber wiring board. However, none of optical fiber wiring boards so far proposed has realized an optical fiber wiring board in which special measures are taken for solving these problems.

SUMMARY OF THE INVENTION

An object of the present invention is to provide an optical fiber wiring board and a manufacturing method thereof with an excellent optical property, high reliability and superior mounting properties, which eliminates following disadvantages of a conventional optical fiber wiring board;

an optical loss caused by a stress at the time of bending of an optical fiber wiring board in which optical fibers are sandwiched between substrates or films;

generation of stress and a decrease in flexibility at the time of curing of an embedding type optical fiber wiring board;

weak mechanical strength observed in a certain specific resin used for an embedding type optical fiber wiring board; and deterioration of mounting properties caused by an increase in weight commonly occurring in an embedding type optical fiber wiring board in which optical fibers are embedded in the resin.

A first aspect of the present invention relates to an optical fiber component for connection comprising a substrate on which a plurality of optical fibers being wired, wherein a foam polymer layer is provided on a surface of the substrate wiring the optical fibers, or both on a surface of the substrate wiring the optical fibers and on a surface opposite to the surface of the substrate wiring the optical fibers, or so that whole of the substrate is covered.

According to another embodiment of the first aspect of the invention, an optical fiber component for connection of the present invention comprises a substrate on which a plurality of optical fibers being wired, wherein the substrate is a foam polymer, and a foam polymer layer is provided on a surface of the substrate wiring optical fibers.

In an optical fiber component for connection of the first aspect of the invention, when the optical fiber component for connection has a portion in which the plurality of optical fibers are crossed and overlapped mutually, a filler selected from a flexible material and an elastic material may be filled into at least the portion in which the plurality of optical fibers are crossed and overlapped mutually.

The second aspect of the present invention relates to a manufacturing method for an optical fiber component for connection. This manufacturing method manufactures an optical fiber component for connection comprising a substrate, a plurality of optical fibers being wired thereon and a foam polymer layer, comprising the steps of:

applying a polymer on a surface of the substrate wiring the optical fibers, or both on a surface of the substrate wiring the optical fibers and on a surface opposite to the surface of the substrate wiring the optical fibers, or so that whole of the substrate is covered; and foaming the polymer to form the foam polymer layer.

In the manufacturing method of the optical fiber component for connection, the foam polymer is applied by an application method selected from an injection method, a dipping method, and a spray method.

According to another embodiment of the second aspect of the invention, a manufacturing method of the present invention manufactures an optical fiber component for connection comprising a substrate, a plurality of optical fibers being wired thereon and a foam polymer layer and comprises a step of adhering a foam polymer on a surface of the substrate wiring the optical fibers, or both on a surface of the substrate wiring the optical fibers and on a surface opposite to the surface of the substrate wiring the optical fibers, or so that whole of the substrate is covered to form the foam polymer layer.

Moreover, in a manufacturing method for an optical fiber component for connection of this embodiment, the step in which the foam polymer is adhered to form a foam polymer layer is performed by providing an adhesive layer beforehand on the substrate or the foam polymer. An adhesive layer on the substrate may be an adhesive layer for optical fiber wiring provided beforehand on the substrate.

Moreover, the manufacturing method for an optical fiber component for connection of the present invention may have further a step of filling a filler comprising a flexible material or an elastic material before the step of forming the above described foam polymer layer. When an optical fiber portion on the substrate has a portion in which the optical fibers are crossed and overlapped mutually, the filler is preferably filled in the portion.

Furthermore, a manufacturing method of an optical fiber component for connection of the present invention may have further a step of providing a protective layer on the foam polymer layer after the step of forming the above described foam polymer layer. In the manufacturing method of the optical fiber component for connection according to of the second aspect of the invention, when a foam polymer layer is provided by adhesion, a protective layer may be provided by adhering a foam polymer with a protective layer provided beforehand on the substrate.

As mentioned above, a lightweight optical fiber component for connection may be obtained, and improvement in flexibility and mechanical property may be achieved using the foam polymer layer of a present invention. Moreover, an optical fiber component for connection of the present invention is excellent in each property, such as workability, mounting property, and reliability. Furthermore, an excellent optical fiber component for connection may be manufactured by a manufacturing method of the present invention.

The above and other objects, effects, features and advantages of the present invention will become more apparent from the following description of embodiments thereof taken in conjunction with the accompanying drawings.

BRIEF DESCRIPTION OF THE DRAWINGS

FIG. 1A is a top view and FIG. 1B is a sectional view;

FIGS. 2A and 2A are schematic illustrations for describing the second embodiment of an optical fiber component for connection of the present invention, i.e. a case where a foam polymer layer is provided on a surface of a substrate with optical fibers wired thereon, and on a surface on back side;

FIG. 2A is a top view and FIG. 2B is a sectional view;

FIG. 3A is a top view and FIG. 3B is a sectional view;

FIGS. 4A and 4B are schematic illustrations for describing the fourth embodiment of an optical fiber component for connection of the present invention, i.e., a case where a portion in which optical fibers are crossed or overlapped is filled up with filler;

FIG. 4A is a top view and FIG. 4B is a sectional view;

FIGS. 5A and 5B are schematic illustrations for describing the fifth embodiment of an optical fiber component for connection of the present invention, i.e., a case where a foam polymer layer is provided on a surface of a substrate with optical fibers wired thereon, a surface on back side, and side faces, (a case where whole of the substrate is covered);

FIG. 5A is a top view and FIG. 5B is a sectional view;

FIGS. 6A and 6B are schematic illustrations for describing the sixth embodiment of an optical fiber component for connection of the present invention, i.e., a case where a foam polymer is used as a substrate;

FIG. 6A is a top view and FIG. 6B is a sectional view;

DETAILED DESCRIPTION OF PREFERRED EMBODIMENTS

Figure 1A:
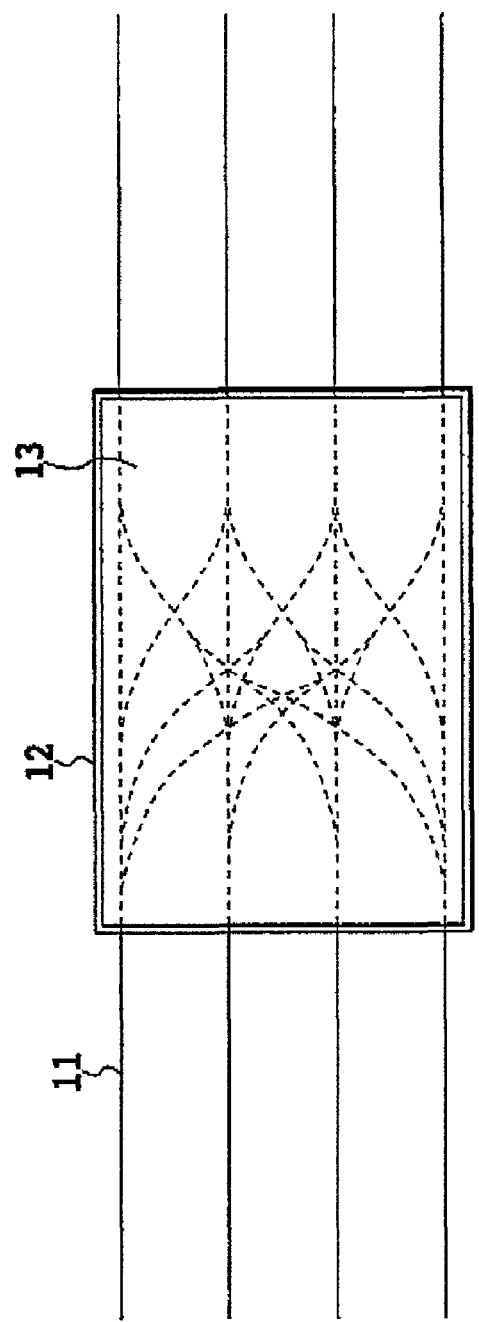
FIGS. 1A and 1B are schematic illustrations for describing the first embodiment of an optical fiber component for connection of the present invention, i.e., a case where a foam polymer layer is provided on a surface of a substrate with optical fibers wired thereon.

The present inventors made trials for improvement in order to solve problems in the conventional optical fiber wiring board; such as, an increase in optical loss due to a stress generated at the time of bending in an optical fiber wiring substrate of a sandwiched type in which the optical fibers were sandwiched between substrates or between films, and a stress generation at the time of curing and a decrease in flexibility in an embedding type optical fiber wiring board embedding optical fibers in a thermoplastic resin.

As a material for embedding, the present inventors devised an embedded type optical fiber wiring board with a silicone resin and the material proved to be of small shrinkage at the time of curing of resin and to have flexibility after curing was obtained. Accordingly, since this optical fiber wiring board is formed using a silicone resin with small shrinkage at the time of curing and with flexibility after curing, an optical fiber wiring board was obtained in which a stress given to an optical fiber at the time of curing is reduced, flexibility after curing is not lost, and further an increase in optical loss at the time of bending is not obtained.

However the embedded type optical fiber wiring board using a silicone resin does not always have a high mechanical strength to force of scratching or cut etc. at the time of mounting, and therefore still has problems remained about mechanical property. Moreover, a problem of weight for embedding type also still remains.

With an optical fiber component for connection of the present invention (optical fiber wiring board) described below, the present inventors conquered the above described problems. Moreover, the present invention also provides a manufacturing method.

The present invention will be described in detail below.

The first aspect of the invention relates to an optical fiber component for connection comprising a substrate on which a plurality of optical fibers being wired, in particular to an optical fiber component for connections wherein a foam polymer layer is provided on a surface of the substrate wiring the optical fibers, or both on a surface of the substrate wiring the optical fibers and on a surface opposite to the surface of the substrate wiring the optical fibers (a surface on back side of a substrate without optical fibers being wired; hereinafter referred to as only a surface on back side of a substrate), or so that whole of the substrate is covered.

In one embodiment of the present invention, a foam polymer layer is provided so that it may cover wiring of optical fibers on a surface where the optical fibers on a substrate are wired. In a case of this embodiment, the foam polymer layer may further cover side faces of the substrate. Moreover, in another embodiment, foam polymer layers are provided on both of the surface of the substrate wiring the optical fibers and the surface opposite to the surface of the substrate wiring the optical fibers (the surface on back side of a substrate). Furthermore, in another embodiment, foam polymer layers are provided so that the whole substrate (the surface of the substrate wiring the optical fibers, the surface on back side of a substrate, and side faces) may be covered.

In the present invention, a foam polymer layer does not necessarily cover a surface top of a substrate uniformly, and if needed, a foam polymer layer may be provided so that it may have openings.

In the case where the foam polymer layer of the present invention is provided on a side with optical fibers being wired thereon, it is provided so that the optical fibers are covered, that is, the optical fibers are embedded in a foam polymer layer, on a substrate. A foam polymer layer may be formed by making a foam polymer applied on the substrate foamed, or a polymer formed by being foamed beforehand may be adhered onto a substrate directly or through an adhesive layer such as adhesives or adhesive sheets. Rubber adhesives that retain flexibility, elasticity, etc. after cured and have elasticity are preferable as adhesives. In the present invention, an adhesive layer may be prepared on a foam polymer, and this may be adhered to the substrate, or the adhesive layer is provided on the substrate and the foamed polymer may be adhered thereto. In addition, adhesion of the foamed polymer to the substrate will be illustrated in full detail in a manufacturing method of an optical fiber component for connection mentioned later.

Furthermore, in the present invention, a protective layer may be provided on the foam polymer layer.

A foam polymer layer of the present invention is formed of foaming materials, such as foam polymers and foaming resins. In the specification, such foaming materials are generically referred to as foam polymers, and a layer formed of such foaming materials is referred to as a foam polymer layer. Although foam polymers are not especially limited if they are polymers in which considerable reduction in density, improvement in flexibility and elasticity, etc. may be expected by being foamed, it is preferable to be selected from polymer materials, such as silicones, urethanes, phenol resins, chloroprenes and fluororubbers with foaming property, or mixtures of the above described polymers. Silicones are especially preferable which is excellent in all of flame retardancy, mechanical strength, flexibility, environmental properties, heat resistance, and solvent resistance. Moreover, silicones are preferably composed of two components.

In the present invention, although a thickness of a film of the foam polymer layer is dependent on an optical fiber component for connection, it is preferably approximately 1 to 2 mm, and most preferably approximately 2 mm.

An optical fiber used for an optical fiber component for connection of the present invention may be of any kind of optical fiber, as long as it can be used as an optical fiber component for connection. An optical fiber for communication or an optical fiber for particular application, and a type like a tape fiber may be used.

A substrate used in the present invention may be of any kind of substrates, such as a plastic plate, as long as it can be used as an optical fiber component for connection. A substrate that has flexibility is more preferable. For example, a film formed with polymers, such as polyethylene terephthalates (PET) and polyamides, may be used. In addition, in the present invention, a sheet of a foam polymer as a foaming polyurethane sheet may also be used as a substrate, for example. A size of a substrate may be freely selected based on installation conditions and on a purpose of use of an optical fiber component for connection. Moreover, a thickness of a substrate may also be freely selected based on conditions and purposes.

A protective layer of the present invention is provided in order to compensate characteristics of a foam polymer layer. Therefore, for example, when a foam polymer layer with a low mechanical strength is used, a material with enough mechanical strength as a protective layer may just be prepared. Moreover, when a foam polymer layer with low flame retardancy is used, a highly flame-retardant protective layer may just be prepared. Although a protective layer cannot be specified since it is variously selected in this way, depending on a foam polymer layer, for example, the above described foam silicone having characteristics, such as outstanding flame retardancy, mechanical strength, etc., may be mentioned. As other protective layers, metallic foils, such as aluminum foil, plastic films, rubber-like protective layers with high stretchability etc. may be mentioned, and rubber-like protective layers with high stretchability are most preferable among the above described examples. In addition, in the present invention, the protective layers are not necessarily a foam polymer.

Moreover in the present invention in the case where a plurality of optical fibers are wired by being made to cross mutually, overlapped, a portion is formed in which the optical fibers are crossed and overlapped. In the specification, "a portion in which optical fibers are crossed and overlapped mutually" represents "a portion in which a plurality of optical fibers are crossed mutually", "a portion in which optical fibers are wired on the substrate in a state of being adjoined in parallel or overlapped on the substrate", "a portion in which optical fibers are branched or connected mutually" etc.

Since optical fibers are in a close range mutually at the above described crossing portion, overlapping portion, and connecting or branching portion, they are very sensitive to external force or stress. Therefore, in some case a microbending may be generated in such a portion by external force and stress, and a loss of light signal that transmits inside of an optical fiber may be increased. Accordingly, in order to prevent increase in such optical loss, it is preferable that a crossing and overlapping portion of optical fibers are further filled up with a flexible material or an elastic material. Protection from external force or stress for an optical fiber may be enhanced by being filled up with fillers.

Although flexible material fillers or elastic material fillers that may be used in the present invention are not especially limited, silicone resins having outstanding flexibility and elasticity may be mentioned.

Thus, following effects are expectable by preparing a foam polymer layer instead of films and thermoplastic resins, etc. that were conventionally used in order to constitute an optical fiber component for connection.

Since a foam polymer has much higher flexibility compared with films or usual polymers, a stress given to an optical fiber is small when an optical fiber component for connection is bent, and as a result, excessive optical loss at the time of bending may be prevented.

Moreover, in a foam polymer, since small bubbles (so-called cell) having gas, such as air, being contained are formed, even if an optical fiber component for connection is bent in an acute angle, cracks are not formed. Moreover, even if cracks are formed, since only cells existing on the surface and near the surface are destroyed, a progress of cracks may be controlled. For this reason, cracks are not spread. Especially when a foam silicone is used, since it has a better shearing property as compared with silicone resins without foam, the above described effect is demonstrated significantly. Furthermore, since these cells play a role of cushioning, a foam polymer layer demonstrates high elasticity. Therefore, even if external force is given to the optical fiber component for connection, external force is absorbed and thus a function protecting an optical fiber is demonstrated.

A lighter weight of a foam polymer layer (finally, light weight of the optical fiber component for connection) may be obtained compared with conventional films and thermoplastic resin using a foam polymer. Density of a foam polymer may be decreased up to approximately 0.2 g/cm$^3$, and thus approximately $1/10$ of weight may be realized in comparison with conventional thermoplastic resins with the same thickness. Thus, the weight of the optical fiber component for connection may be remarkably reduced by containing a foam polymer layer in the part. This effect is especially demonstrated notably in the optical fiber component for connection installed between racks.

Furthermore, in the present invention, a foam polymer layer may be provided also not only on the substrate wiring the optical fibers, but on a surface on back side of the substrate, or on whole of the substrate as mentioned above, and thus, when two or more foam polymer layers may be provided, the above described effect of reduction in weight is greatly demonstrated. Moreover, when a foam polymer layer is provided on the surface of a substrate wiring the optical fibers, or on a surface on back side of a substrate, and on side faces etc., since the foam polymer layer has features of light weight, elasticity and high flexibility, stress may be reduced compared with conventional components in the case where the optical fiber component for connection is bent, and as a result components that is easily bent may be provided.

Moreover, in the present invention, a foam polymer may be used as a substrate itself. According to such a method, since an optical fiber component for connection itself is formed with a flexible material, the above described effect may be further heightened.

The first Invention will be further described with reference to drawings below in details. In addition, following figures are exemplification for describing the present invention, and do not intend limiting the present invention. Moreover, what was described above may be used for materials etc.

Figure 1B:
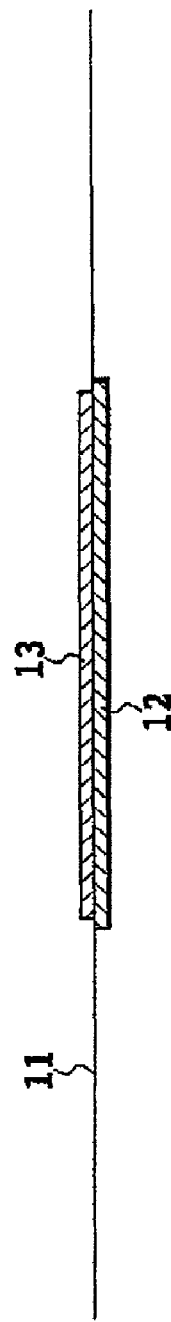

FIGS. 1A and 1B are drawings showing an optical fiber wiring board of the first embodiment of an optical fiber components for connection of the present invention. FIG. 1A is a top view of an optical fiber wiring board of the embodiment, and FIG. 1B is a sectional view of this component. As shown in FIG. 1A, optical fibers (11) are wired with desired pattern on a substrate (12), and a foam polymer layer (13) is prepared on top of this wired portion, i.e. substrate to cover optical fibers in the optical fiber wiring board of the present invention. In the example shown in FIG. 1A, although one optical fiber (11) is connected to each of the optical fibers on the substrate (12), it cannot be limited to such a wiring, and the optical fibers may be wired by any desired pattern in the present invention. In this embodiment, it is characterized by that the wired portion of the optical fibers is covered by a foam polymer. The foam polymer layer may be prepared by applying the foam polymer on the substrate and by making the foam polymer being foamed. In other case, for example, a foam polymer layer that is foamed beforehand is prepared by manufacturing a polymer foamed, and subsequently the foam polymer layer is used as it is when it has enough tackiness. However, when it does not have enough tackiness, layers, such as an adhesive sheet or adhesives, are prepared onto the substrate or onto the foam polymer layer. Then the foam polymer layer is adhered on a substrate to prepare finally a foam polymer layer. In addition, when adhesives are used, it is preferable that an adhesive layer is provided so that the above described features of the foam polymer layer might not be spoiled.

In this embodiment, a foam polymer layer does not need to be provided so that whole of one surface of the substrate is covered as shown in FIGS. 1A and 1B, and the foam polymer layer does not necessarily need to be provided onto a portion without optical fibers wired. Moreover, the foam polymer layer may be formed on the portion of not only one surface of a substrate but side faces.

FIGS. 2A and 2B are drawings showing an optical fiber wiring board of the second embodiment of an optical fiber component for connection of the present invention. FIG. 2A is a top view of an optical fiber wiring board of the embodiment, and FIG. 2B is a sectional view of this component. As shown in FIG. 2A, optical fibers (11) are wired with desired pattern on a substrate (12), and a foam polymer layer (13) is prepared on top of this wired portion, i.e. substrate to cover optical fibers in the optical fiber wiring board of the present invention. In this embodiment, as shown in FIG. 2B, the foam polymer layer is provided also on a surface without optical fibers prepared (a surface on back side of the substrate) of the substrate (12).

Figure 3A:
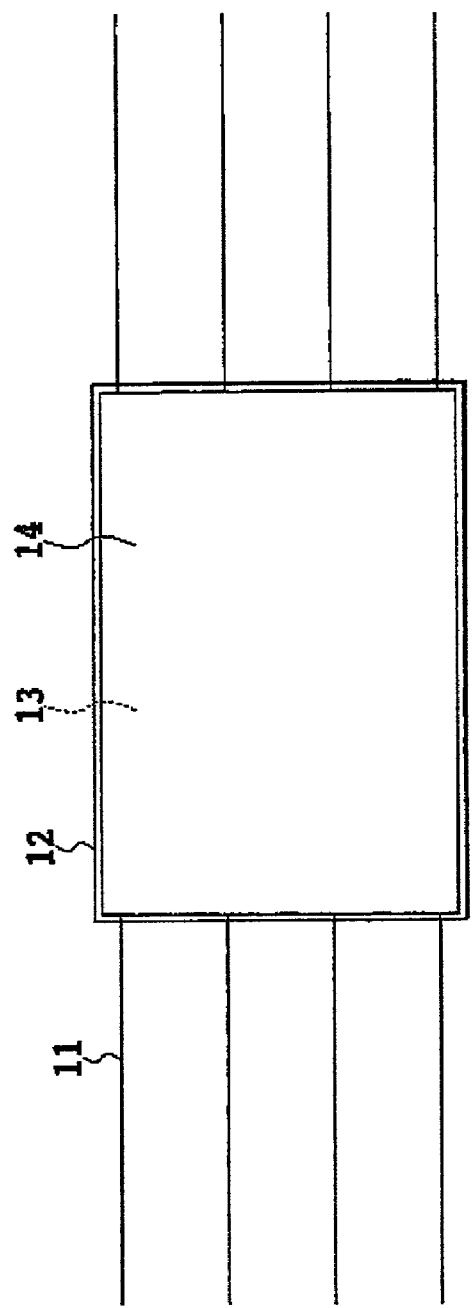
FIGS. 3A and 3B are schematic illustrations for describing the third embodiment of an optical fiber component for connection of the present invention, i.e., a case where a protective layer is provided on a foam polymer layer in FIG. 1.
Figure 3B:
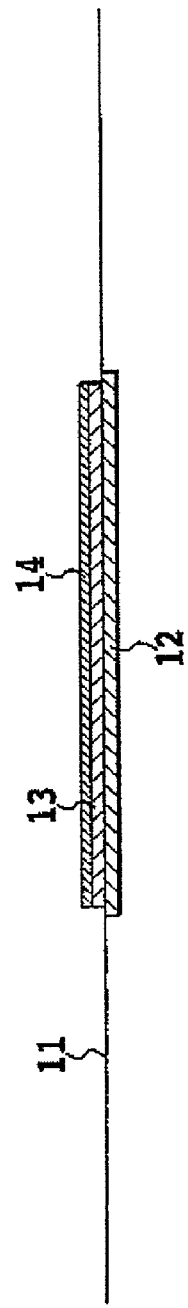

FIGS. 3A and 3B are drawings showing an optical fiber wiring board of the third embodiment of an optical fiber component for connection of the present invention. FIG. 3A is a top view of an optical fiber wiring board of the embodiment, and FIG. 3B is a sectional view of this component. This embodiment is an example in the case where a protective layer (14) is further prepared on the foam polymer layer of the optical fiber component for connection shown in FIGS. 1A and 1B. In addition, FIGS. 3A and 3B are exemplifications about the first embodiment, and when the foam polymer layer is provided also on the surface on back side of the substrate as in the second embodiment, a protective layer may be prepared also on this layer side. Moreover, when the foam polymer is prepared on a side face portion, the protective layer may be prepared also on this portion. In addition, the substrate, the foam polymer layer, etc. are of the same as is described in the above described first and second embodiments.

FIGS. 4A and 4B are drawings showing an optical fiber wiring board of the fourth embodiment of an optical fiber component for connection of the present invention. FIG. 4A is a top view of an optical fiber wiring board of the embodiment, and FIG. 4B is a sectional view of this component. This embodiment is an example in which a layer

(15) of filler with flexibility or elasticity is prepared on a portion in which optical fibers are crossed of the optical fiber components for connection in the first embodiment shown in FIG. 1A. In addition, the substrate, the foam polymer layer, etc. are of the same as is described in the above described first embodiment.

FIGS. 5A and 5B are drawings showing an optical fiber wiring board of the fifth embodiment of an optical fiber components for connection of the present invention. FIG. 5A is a top view of an optical fiber wiring board of the embodiment, and FIG. 5B is a sectional view of this component. This embodiment is an example in which a foam polymer layer is provided so that whole of a substrate (a surface of the substrate wiring optical fibers, a surface on back side of the substrate, and side faces) may be covered. As shown in FIGS. 5A and 5B, optical fibers (11) are wired on a substrate (12), and a foam polymer layer (13) is prepared so that this substrate (12) and the optical fibers (11) on the substrate are completely covered. In this embodiment, since whole of the substrate is covered by the foam polymer layer, the wiring board having a high protective effect to external force or stress may be obtained. In addition, in the foam polymer layer, a layer may be used having the same material and same characteristics as that of description in the above described first and the second embodiment. Moreover, in this embodiment, further a protective layer described in the above described third embodiment may also be prepared. In this case, a protective layer may be prepared on any of a surface of a substrate wiring the optical-fibers, a surface on back side of a substrate, and side faces.

FIGS. 6A and 6B are drawings showing an optical fiber wiring board of the sixth embodiment of an optical fiber component for connection of the present invention. FIG. 6A is a top view of an optical fiber wiring board of the embodiment, and FIG. 6B is a sectional view of this component. As shown in FIG. 6A, optical fibers (11) are wired with desired pattern on a substrate (13), and a foam polymer layer (13) is prepared on top of this wired portion, i.e. substrate to cover optical fibers in the optical fiber wiring board of the present invention. This embodiment is characterized by forming the substrate (13) itself by the foam polymer besides the wired portion of optical fibers being covered by the foam polymer.

In this embodiment, since the foam polymer with outstanding stretchability, flexibility, elasticity, etc. is used in the substrate, an optical fiber wiring board having outstanding function protecting the optical fibers especially from bending stress is obtained. Moreover, in this embodiment, further a protective layer described in the above described third embodiment may also be prepared. In this case, a protective layer may be prepared on any of the surface of the substrate and the foam polymer layer.

In each of the above described embodiments, since a foam polymer layer is provided, an optical fiber wiring board having high protective effect to external force or stress may be obtained.

Secondly, the second invention will be described. The second invention is a manufacturing method for an optical fiber component for connection of the present invention.

First, the first embodiment of a manufacturing method of the present invention will be described.

In the first embodiment, the manufacturing method of the present invention is a manufacturing method for an optical fiber component for connection comprising a substrate, a plurality of optical fibers being wired thereon and a foam polymer layer, which comprises the steps of applying a polymer on a surface of the substrate wiring the optical fibers, both on a surface of the substrate wiring the optical fibers and on a surface opposite to the surface of the substrate wiring the optical fibers, or so that whole of the substrate is covered and foaming the polymer to form the foam polymer layer.

In a process forming a foam polymer layer of the present invention, as long as it is a method of applying a polymer to a substrate and foaming, any kind of formation method may be adopted. For example, application methods, such as injection method, a dipping method, and a spray method, may be used. In addition, the application of a foam polymer and formation of a foam polymer layer will be concretely described in descriptions of each process mentioned later.

A manufacturing method of the first embodiment is described concretely; a method of this embodiment comprises steps of;

(1) wiring optical fibers on a substrate;

(2) providing a foam polymer layer is provided on a surface of the substrate wiring the optical fibers, or both on a surface of the substrate wiring the optical fibers and on a surface opposite to the surface of the substrate wiring the optical fibers, or so that whole of the substrate is covered; and (3) foaming the foam polymer layer.

A manufacturing method of the first embodiment will be described in accordance with each step below.

In addition, as materials to be used in each step, what was described in the first invention may be used.

The first step is a step in which optical fibers are wired on a substrate. In wiring of the optical fibers onto a substrate top, a method well-known in the technical field may be used according to the object of wiring. For example, optical fibers may be wired on the substrate using a wiring equipment currently disclosed in Japanese Patent Application Laid-open No. 11-119034 (1999). In addition, in the present invention, an adhesive layer may be provided on the substrate, or optical fibers may be wired using a substrate with an adhesive layer provided thereon beforehand. For example, a substrate to which adhesives are applied beforehand in a lowest layer is set to the wiring equipment in the above described official report, and optical fibers may be wired to the substrate according to the above described official report.

The second step is a step in which a foam polymer is applied on a substrate. In the present invention, a foam polymer is applied at least to a wired portion of the optical fibers on a substrate.

In the first embodiment, a foam polymer may be applied using any method as long as it is a method by which polymer may be applied to a substrate, but it is preferable to be applied by application methods, such as an injection method, a dipping method, and a spray method. A foam polymer is preferably selected from polymer materials, such as silicones, urethanes, phenol resins, chloroprenes and fluororubbers with foaming property, or mixtures of these above described materials mixed together. A foam polymer is preferably composed of two components. Two kinds of component liquid that constitute a foam polymer are mixed immediately before start of application, for example, are filled up into an injection equipment, and then this mixture is applied to a predetermined position of a substrate.

Moreover, in the case where a foam polymer is applied by the dipping method, a side of the substrate to which the foam polymer is applied is immersed into a solution (preferably a solution composed of two components) of the foam polymer, and thus an application of a foam polymer is carried out. Although conditions of being immersed will not be especially limited if an application fully carries out, for example, after the side of the substrate to which the foam polymer is applied is immersed into the foam polymer solution composed of two components immediately after mixing, the substrate is preferably taken out quickly and subsequently left to be foamed at normal temperature. When the foam polymer is applied by the spray method, a spray equipment is filled up with the solution (preferably the solution composed of two components) of the foam polymer, and then a mixture should just be sprayed on the side of the substrate to which the foam polymer is applied until a desired thickness of the foam polymer is obtained. In the present invention, as a spraying equipment, an equipment that may spray while mixing immediately before spraying of the foam polymer solution composed of two components is preferable.

In one embodiment of the present invention, a foam polymer is applied to a surface of a substrate wiring the optical fibers. In the case of this embodiment, the foam polymer may be applied also on a side surface of the substrate. Moreover, in another embodiment, the foam polymer may also be applied on both of the surface of the substrate wiring the optical fibers and a surface on back side of the substrate. Furthermore, in another embodiment, the foam polymer may be applied so that whole of the substrate (the surface of the substrate wiring the optical fibers, the surface on back side of the substrate, and the side faces) may be covered.

A thickness of the foam polymer, it is preferable to have a thickness of a level in which the foam polymer layer formed after foaming may cover at least whole of the optical fibers. Accordingly, the thickness of an applied layer is determined, taking expansion coefficient after foamed (for example, 4 to 5 times) into consideration.

The third step is a step in which a foam polymer is foamed and a foam polymer layer is formed.

Foaming step is carried out in a way that the foam polymer applied as mentioned above is left to stand at approximately a room temperature, preferably at 25° C. to 60° C., and more preferably 30° C. to 40° C.; for 5 minutes to 1 hour, preferably for 10 minutes to 30 minutes. For example, when a silicone foam polymer composed of two components is applied on a substrate using an injection method, foaming should just be carried out for 20 minutes, at temperature of approximately 40° C., In the present invention, when the foam polymer layer is formed only on a surface of a substrate wiring the optical fibers, a temperature of foaming is preferably a temperature similar to room temperature. The reason is that curl of the component may occur when a manufactured optical fiber component for connection is returned to room temperature, if the foam polymer is applied only to the surface of the substrate wiring the optical fibers and then foaming is carried out at high temperature. In addition, when a foam polymer is applied at least to both of the surface of the substrate wiring the optical fibers and the surface on back side of the substrate, even if a foamed is carried out at a high temperature, such curl is hardly generated.

According to the present invention, the optical fiber component for connection in which the foam polymer layer is provided on both of the surface of the substrate wiring the optical fibers and the surface on back side of the substrate has improved flexibility, and may give easy handling.

Next, the second embodiment of the manufacturing method of the present invention will be described.

In the second embodiment, the manufacturing method of the present invention is a manufacturing method for an optical fiber component for connection comprising a substrate, a plurality of optical fibers being wired thereon and a foam polymer layer, and comprises a step of adhering a foam polymer on a surface of the substrate wiring the optical fibers, or both on a surface of the substrate wiring the optical fibers and on a surface opposite to the surface of the substrate wiring the optical fibers, or so that whole of the substrate is covered to form the foam polymer layer.

Accordingly, the second embodiment is a manufacturing method in which the foam polymer being foamed beforehand is adhered to the substrate using fixing means like adhesives.

Specifically, the manufacturing method of this embodiment comprises steps of:

(1) wiring the optical fibers on a substrate; and
(2) adhering a foam polymer on a surface of the substrate wiring the optical fibers, or both on a surface of the substrate wiring the optical fibers and on a surface opposite to the surface of the substrate wiring the optical fibers, or so that whole of the substrate is covered to form the foam polymer layer.

The manufacturing method of this embodiment will be described in accordance with each step below.

In addition, as materials to be used in each step what was described in the first invention may be used.

The first step is the same step as the first embodiment of the manufacturing method of the present invention.

The second step is a step in which a foam polymer being foamed beforehand is adhered on a substrate. In this step, a foam polymer being foamed beforehand is used, which is cut into a pattern of two or more wired optical fibers or into a form of a part of the substrate or whole of the substrate. In the present invention, if the foam polymer itself has tackiness, it is adhered on the substrate as it is. In addition, in the present invention, an adhesive layer is provided on a foam polymer or a substrate, and the foam polymer may also be adhered onto a desired part of the substrate. For example, after an adhesive tape is stuck or adhesives etc. are applied to the substrate or the foam polymer, the foam polymer should just be adhered onto the substrate. Moreover in the present invention, as mentioned above, when optical fibers are wired on a substrate, an adhesives layer may be prepared on the substrate, or a substrate on which an adhesive layer is provided beforehand may also be used. In such a case, an adhesive layer is not newly prepared but the foam polymer may be adhered on the substrate. Accordingly, in this specification that an adhesive layer is provided on a foam polymer or a substrate also includes a case where an adhesive layer that is prepared beforehand on a substrate for adhesion of an optical fiber is used for adhesion of the foam polymer being foamed, in addition to a case where an adhesive layer is newly prepared on a substrate or a foam polymer being foamed beforehand.

Although any type of adhesives or tapes may be used, if a foam polymer may be adhered on a substrate with it, for example, rubber adhesives that retain flexibility, elasticity, etc. and have stretchability also after adhesion and curing may be mentioned.

In the second embodiment, since a foam polymer being foamed beforehand is adhered with adhesives etc., workability is raised.

Hereinafter, a further step that can be added and applied to both of the above described manufacturing methods of the first embodiment and the second embodiment will be described.

A manufacturing method of the present invention may have a step in which fillers with flexibility or elasticity is applied to a portion in which optical fibers are crossed or overlapped before a foam polymer layer is formed, and then a layer of the filler is formed. Such fillers are applied and the portion is covered beforehand for attaining further strengthened protection to the portion. The filler which can be used by the present invention is as mentioned above.

These fillers should just be applied to a desired region by an injection method, a spray method, etc. The layer of fillers are formed after an application using a procedure and conditions well-known currently in the fields, such as curing and drying etc. For example, when a filler layer is formed by the injection method, first, an injection cylinder (syringe) and injection equipment are filled with the filler, the filler is injected into a portion in which optical fibers wired on a substrate are crossed or overlapped, and curing, drying, etc. are carried out in room temperature and air if needed. Then, a foam polymer layer is applied or adhered. As for thickness of the layer of the filler, it is preferable to have at least enough thickness of a level to cover optical fibers. If diameters of optical fibers are taken into consideration, specifically, no less than 250 $\mu$m is required for the thickness of the filler layer.

A manufacturing method of the present invention may have a step in which a protective layer is provided on a foam polymer layer after a formation step of the above described foam polymer layer. Such a protective layer is formed with the material described in the first invention. The protective layer may be formed on the foam polymer layer using various application methods, such as injection method, a spray method, and a dipping method. The protective layer is formed after an application using procedures and conditions currently well-known in the fields, such as curing and drying. For example, a protective layer may be formed on the foam polymer layer using a spray method, and steps of curing, drying, etc. should just be performed in room temperature and air. Moreover, the present invention includes a method in which an optical fiber component for connection with a protective layer is manufactured by preparing the protective layer beforehand onto the foam polymer being foamed and subsequently by adhering this layer to the substrate, in addition to a method in which an optical fiber component for connection with the protective layer is manufactured using a method applying the protective layer later as mentioned above.

In the present invention, although a protective layer may be prepared onto any portion of a foam polymer layer, it is preferable that a protective layer may be prepared at lease onto a side on which the optical fibers of an optical fiber component for connection are wired.

Although a thickness of the protective layer is not especially limited, in a case of silicone resin, for example, it may be no more than 0.1 mm.

Moreover, in metallic foil as aluminum foil, for example, it is approximately 100 $\mu$m.

EXAMPLES

Although the present invention is hereinafter described further in details using examples, the following examples are exemplification and should not be construed as limiting the invention. In the present invention, materials previously described may be used in addition to materials as substrates, foam polymers, protective layers, adhesives, etc. in each following example.

Example 1

This example relates to an optical fiber component for connection (optical fiber wiring board) having a structure as shown in FIGS. 1A and 1B that is manufactured by a method in which silicone is used as a foam polymer and this is foamed after being applied.

A substrate (12) was installed in lowest layer of an optical fiber wiring equipment currently disclosed in Japanese Patent Application Laid-Open No. 11-119034 (1999), and optical fiber (11) was wired one at a time. Here, two kinds of optical fiber wiring boards were manufactured, in which polyethylene terephthalate (PET) film and polyimide film with a thickness of 50 $\mu$m with adhesives applied beforehand thereon were used as a substrate.

Next, a foam silicone was applied uniformly and so that the fibers on the substrate are covered using commercially available injection equipment (Shot Master 3, manufactured by Musashi Engineering, Inc.) Here, the foam silicone was composed of two components, and after being mixed by a mixing ratio 10:1, it was quickly set to injection equipment and applied. Thickness applied was set to about 0.5 mm in consideration of a coefficient of volume expansion by foaming (about four to five times). It was left to stand for foaming for 20 minutes at temperature of 40° C. after application. The optical fiber wiring board covered by the foam silicone by this method was obtained.

Comparative Example 1

For comparison, an optical fiber wiring board of a sandwiched type was manufactured in which a pattern of the same wiring as the above described example was sandwiched in a form where adhesive layers were adhered between the polyimide films (a trade name; Kapton, product made by DuPont Company) of a thickness of 50 $\mu$m with the adhesive layer prepared thereon.

The characteristics of the optical fiber wiring board of the present invention using the polyimide film among the optical fiber wiring boards of Example 1 acquired as mentioned above, and the optical fiber wiring board of the sandwiched type of Comparative Example were estimated by methods of temperature and moisture resistance cyclic examination, bending stress examination, and normal stress examination.

Evaluation Method

Temperature and Moisture Resistance Cyclic Test

Figure 7:
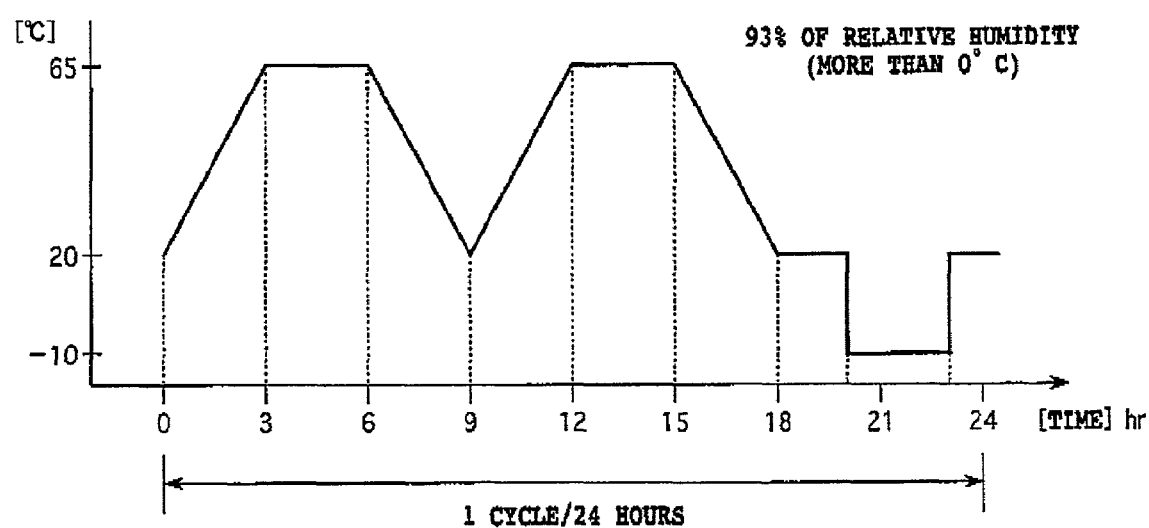
FIG. 7 is a graph showing a pattern of one cycle of a temperature and moisture resistance cyclic test.

In temperature and moisture resistance cyclic test, a cycle (1 cycle 24 hours) of a pattern shown in FIG. 7 was carried out 20 cycles (for 20 days) under a condition at no less than 0° C., 93% of relative humidity, and at temperature of on −10° C. to 65° C. Signal light was sent into the optical fiber from outside of a system, and an optical loss of the optical fiber wiring board was measured every 15 minutes during the temperature and moisture resistance cyclic test.

Bending Stress Examination

Figure 8:
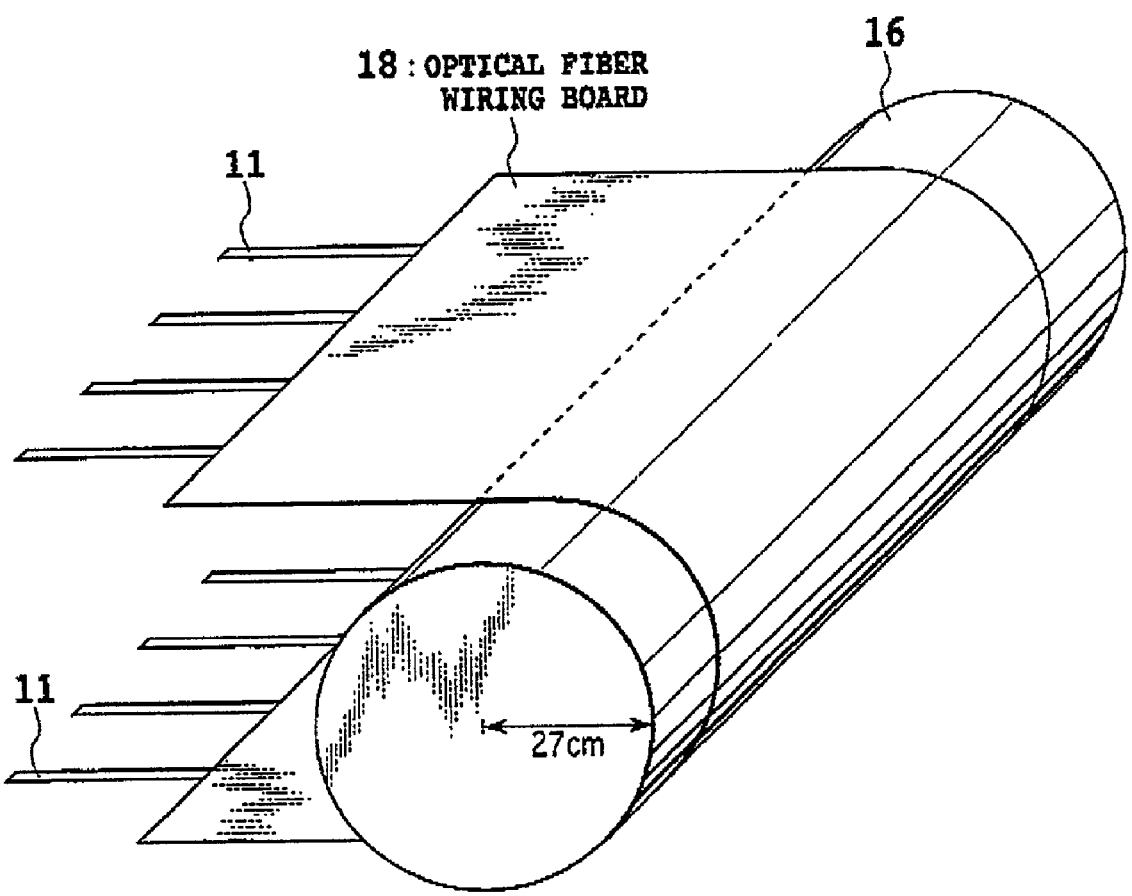
FIG. 8 is a schematic illustration at the time of carrying out a bending stress examination.

In a bending stress examination shown in FIG. 8, an optical fiber wiring board (18) was twisted so that it might have an angle of no less than 90° on a round bar (16) with a radius of 27 cm, and an optical loss of the optical fiber at that time was measured.

Normal Stress Examination

In the normal stress examination, an optical fiber wiring board is placed on a level desk, and on the optical fiber wiring board, a metal plate of a thin rigid body with the same area and same form as the wiring board was placed so that load may be uniformly given to the whole optical fiber wiring board. Subsequently a two kilograms of spindle was further placed on the metal plate, and the optical loss of the optical fiber at that time was measured.

Each above described examination result is shown in the following table 1.

TABLE 1

|  | Example 1 | Comparative Example 1 |
|---|---|---|
| Temperature and moisture resistance cyclic test | Change in optical strength no more than 0.05 dB | The same as left |
| Bending stress examination | With no change in optical strength | Change in optical strength 0.7 dB |
| Normal stress examination | With no change in optical strength | Change in optical strength 0.15 dB |

From the result of Table 1, the optical fiber wiring board covered by the foamed silicone of the present invention showed better characteristics in the stress examination compared with the conventional sandwiched type optical fiber wiring board. Moreover, this result was almost the same as a conventional embedding type by flexible resin, but a weight of the optical fiber wiring board was reduced even by about ½, and a significant lightweight was realized.

Moreover, in this example, although a foamed silicone was used, even when urethane foam, fluorine rubber foam, etc. were used instead of the foamed silicone, the same result was obtained.

Example 2

This example is an optical fiber wiring board with a structure as shown in FIGS. 2A and 2B, and is related with an optical fiber wiring board manufactured by a method in which silicone is used as a foam polymer and this is foamed after applied.

The optical fiber wiring board as shown in FIGS. 1A and 1B was first manufactured as in Example 1, and subsequently, according to the procedure same in Example 1 described above, the same foam silicone as Example 1 was applied to a surface on back side of a substrate, and then foamed.

Thus obtained optical fiber wiring board was evaluated using the above described evaluation method. Results are shown in Table 2. Moreover, the result of the optical fiber wiring board of the above-mentioned comparative example 1 was also shown as comparison.

TABLE 2

|  | Example 2 | Comparative Example 1 |
|---|---|---|
| Temperature and moisture resistance cyclic test | Change in optical strength no more than 0.05 dB | The same as left |
| Bending stress examination | With no change in optical strength | Change in optical strength 0.7 dB |
| Normal stress examination | With no change in optical strength | Change in optical strength 0.15 dB |

It turned out to be clear that a stress needed in order to bend the optical fiber wiring board of this example was reduced about ten percent as compared when the foam silicone is prepared only on one side. This shows that when an optical fiber wiring board is bent in mounting, a smaller stress for bending is required, and working efficiency is improved.

Example 3

This example is an optical fiber wiring board with a structure of having a foam polymer layer covering a whole substrate as shown in FIGS. 5A and 5B, and is related with an optical fiber wiring board manufactured by a method in which silicone is used as a foam polymer, and this is foamed after applied by dipping method.

Optical fibers were wired as in Example 1 on a flexible substrate (PET substrate with an adhesive layer prepared beforehand on one side, 50 μm in thickness). Subsequently, this is immersed in a two-component foam silicone solution, and thus the solution was applied onto an upper surface of the substrate (a side with the optical fibers wired), a surface on back side, and side faces, and subsequently foamed. The conditions of foaming etc. are the same as Example 1. Moreover, in this Example, the foam silicone which covers both of upper and back sides was connected on side faces without any gap, and had a wrapping structure for the whole substrate.

Thus, the obtained optical fiber wiring board was evaluated using the above described evaluation method.

The evaluation result was equivalent to what was obtained in the above described Example 2.

In this example, a wiring board with high protective effect to external force or stress was obtained.

Example 4

This example is an optical fiber wiring board with a protective layer as shown in FIGS. 3A and 3B, and it is related with an optical fiber wiring board manufactured by a method in which a foaming urethane is used as a foam polymer, and this is foamed after applied.

Except having used a foaming urethane (a product manufactured by Asahi Glass Company) as a foam polymer, the same procedure as Example 1 was repeated, and an optical fiber wiring board having a side with optical fibers wired covered by foamed urethane was manufactured. Subsequently, a spray application by a silicone resin with outstanding flexibility and elasticity was uniformly carried out by no more than 0.1 mm in thickness as a protective layer on the foamed urethane of this wiring board, and the plate was left to stand for 1 hour to be hardened at room temperature.

Thus obtained optical fiber wiring board was evaluated using the above described evaluation method. The evaluation result was equivalent to what was obtained in the above described example 2.

The optical fiber wiring board of this example has both property of a layer of foamed urethane, and a protective layer. Accordingly, since a silicone excellent in flame retardancy is combined with a foamed urethane, the property of foamed property urethane, which has a disadvantage in flame retardancy although preparation is easy, may be compensable. Thus, according to the present invention, an optical fiber wiring board that may be manufactured easily and also has flame retardancy is producible.

Example 5

This example is an optical fiber wiring board in which filler was filled up as shown in FIGS. 4A and 4B, and is related with an optical fiber wiring board manufactured by a method in which a foaming urethane was used as foam polymer and foamed after applied.

Optical fibers were wired as in Example 1 on a substrate (the same substrate as Example 1) by wiring as shown in FIG. 1A. A portion in which optical fibers were crossed or overlapped was filled up with a silicone resin that has outstanding properties, such as flexibility and elasticity, to a height comparable as a height of an overlap of optical fibers. Subsequently, the same procedure as Example 1 was repeated using a foamed urethane same as the foam polymer as in Example 4, and an optical fiber wiring board having a side with optical fibers wired covered by the foamed urethane was manufactured.

Thus obtained optical fiber wiring board was evaluated using the above described evaluation method. The evaluation result was equivalent to what was obtained in the above described Example 2.

In an optical fiber wiring board of this example, since a portion in which optical fibers were crossed or overlapped was covered by the silicone resin with outstanding properties, such as flexibility and elasticity, an optical fiber wiring board was manufactured, which had excellent characteristics to a stress from outside, and a high reliability.

Example 6

This is an example in which a foamed urethane sheet is used as a foam polymer layer, and this is adhered on a substrate using adhesives or adhesive sheets.

Example 6-1

The optical fiber was wired as in Example 1 on a polyimide substrate (a product name; Kapton, product made is by DuPont Company) with a thickness of 50 $\mu$m on which an adhesive layer for optical fiber adhesion was prepared beforehand on one side using a method the same as shown in FIG. 1A. Next, a adhesive sheet was adhered on one surface of a foamed urethane (a product name: manufactured by Asahi Glass Company) that was beforehand out according to a form of the substrate, and this was then adhered on a side with optical fibers wired of the above described substrate with optical fibers wired, and an optical fiber wiring board was manufactured.

Thus obtained optical fiber wiring board was evaluated using the above described evaluation method. The evaluation result was equivalent to what was obtained in the above described Example 2.

Example 6-2

Instead of using the foamed urethane on which the adhesion sheet was adhered in the above described Example 6-1, the elastomeric adhesive, Sony Bond (manufactured by Sony Corporation) was applied to the substrate with optical fibers wired, and subsequently a foamed urethane was adhered to obtain an optical fiber wiring board.

Thus obtained optical fiber wiring board was evaluated using the above described evaluation method. The evaluation result was equivalent to what was obtained in the above described example 2.

In Example 6, even when a foamed sheet is adhered with adhesives etc., a reliable optical fiber wiring board may be obtained. Moreover, since an optical fiber wiring board is manufactured by adhesion, an optical fiber wiring board can be manufactured simply in a short time.

Example 7

This example is related with an optical fiber wiring board in which a foam polymer is used for a substrate as shown in FIGS. 6A and 6B.

As the first stage, a foamed urethane sheet (3 mm in sheet thickness) on which an adhesive layer is provided beforehand was used as a substrate, and optical fibers were wired by a predetermined wiring pattern (wiring as shown in FIG. 1A) using wiring equipment given in Japanese Patent Application Laid-Open No. 11-119034 (1999).

Next, as the second stage, a foamed urethane sheet (cut according to a form of a substrate beforehand) having the same form as the substrate was adhered on the above described substrate with optical fibers wired. Adhesion was carried out through the adhesive layer provided beforehand on the substrate for wiring of optical fibers. Thus, as shown in FIGS. 6A and 6B, an optical fiber wiring board with a sandwiched structure was obtained in which the optical fibers were sandwiched by the substrate of a foam polymer and the foam polymer layer.

Thus obtained optical fiber wiring board was evaluated using the above described evaluation method. Since a foam polymer that has outstanding stretchability, flexibility, elasticity, etc. was used as a substrate in this example, outstanding characteristics protecting the optical fibers especially from bending stress were demonstrated, compared with a case where a substrate without stretchability as PET or a polyimide was used as a substrate.

Moreover, in this example, an optical fiber wiring board of the present invention as in the above described Example 1 may also be manufactured by a method in which a PET film, a polyimide film, etc. are adhered on a foamed urethane substrate after the first stage.

Example 8

This is an example in which a foam polymer sheet is adhered using an adhesive layer for optical fiber wiring prepared beforehand on a substrate.

A polyimide film with a thickness of 50 $\mu$m on which adhesives were applied beforehand was wired by a predetermined wiring pattern (wiring as shown in FIG. 1A) as in Example 1 using a wiring equipment given in Japanese Patent Application Laid-Open No. 11-119034 (1999). Next, a foam silicone sheet cut beforehand according to a form of the substrate was adhered using the adhesive layer beforehand prepared on the substrate.

Thus obtained optical fiber wiring board was evaluated using the above described evaluation method. An effect equivalent to the above described Example 1 was demonstrated, compared with a conventional optical fiber wiring board with a structure sandwiched by polyimide.

Moreover, in the present invention, substrates specified in the present invention, such as a polyethylene terephthalate (PET) film, may be used instead of the polyimide film. An effect equivalent to Example 1 was acquired also in these cases.

Example 9

This is an example in which a foam polymer with a protective layer prepared beforehand is used.

A foamed urethane was adhered on a substrate as in the above described Example 8 through an adhesive layer beforehand prepared on the substrate using a foamed urethane sheet with aluminum foil adhered on one side. In this case, the foamed urethane sheet was adhered so that a side without aluminum foil adhered thereon might face the substrate. Thus, an optical fiber wiring board having a protective layer was obtained.

Thus obtained optical fiber wiring board was evaluated using the above described evaluation method. An effect equivalent to the above described Example 1 and outstanding mechanical strength were also demonstrated, compared with a conventional optical fiber wiring board having a structure sandwiched by polyimide.

Example 10

This example relates to an optical fiber wiring board having a structure having foam polymer layers not only on a surface of a substrate wiring the optical fibers but on a surface on back side and side faces and is manufactured by being adhered on the substrate.

Example 10-1

Optical fibers were wired by a wiring pattern as shown in FIG. 1A as in Example 1 on a polyimide film with an adhesive layer for optical fiber adhesion prepared. A foamed silicone film beforehand cut according to a form of a substrate was adhered on a surface of this substrate with the optical fibers wired thereon, and on a surface that is not wired (a surface on back side). An adhesive layer was prepared on the foam silicone film, then this was adhered on a surface of the substrate wiring the optical fibers, and on a surface on back side, and thus adhesion was carried out. Thereby, an optical fiber wiring board in which the substrate was sandwiched by foam polymer layers as shown in FIGS. 2A and 2B was obtained.

Thus obtained optical fiber wiring board was evaluated using the above described evaluation method.

The evaluation result was equivalent to what was obtained in the above described Example 2. In this example, a wiring board with high protective effect to external force or stress was obtained.

Example 10-2

In the above described Example 10-1, the foam silicone sheet was cut by bigger size than the substrate, then it was adhered as mentioned above, and an optical fiber wiring substrate in which whole of the substrate was covered by the foam polymer layer as shown in FIGS. 5A and 5B was manufactured. Thereby, an optical fiber wiring board in which whole of the substrate was covered with the foam polymer layer as shown in FIGS. 5A and 5B was obtained.

Thus obtained optical fiber wiring board was evaluated using the above described evaluation method.

The evaluation result was equivalent to what was obtained in the above described Example 2. In this example, a wiring board with high protective effect to external force or stress was obtained.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An optical fiber component consisting of
   a substrate having a first surface and a second surface,
   a first adhesive layer on the first surface of the substrate,
   a second adhesive layer on the first adhesive layer,
   a foam polymer layer on the second adhesive layer, and
   a plurality of optical fibers wired between the first adhesive layer and the second adhesive layer.
   wherein the foam polymer layer covers the whole of the first surface of the substrate.

2. The optical fiber component according to claim 1, wherein said substrate is a foam polymer.

3. The optical fiber component according to claim 1, wherein a protective layer is disposed on said foam polymer layer.

4. The optical fiber component according to claim 3, wherein said protective layer is a protective layer selected from the group consisting of foam silicones, metallic foils, plastic films, and rubber-like protective layers.

5. The optical fiber component according to claim 1, wherein said optical fiber component has a portion in which said plurality of optical fibers are crossed and overlapped, and further includes a filler which is selected from the group consisting of a flexible material and an elastic material, wherein said filler fills at least the portion in which said plurality of optical fibers are crossed and overlapped.

6. The optical fiber component according to claim 5, wherein said filler is at least one silicone resin.

7. The optical fiber component according to claim 1, wherein said optical fibers are selected from the group consisting of optical fibers for communication, optical fibers for particular application, and tape fibers.

8. The optical fiber component according to claim 1, wherein said foam polymer is at least one polymer material selected from the group consisting of silicones, urethanes, phenol resins, chloroprenes, fluororubbers, and mixtures thereof having a foaming property.

9. An optical fiber component consisting of
   a first foam polymer layer;
   a substrate on the first foam polymer layer, the substrate having a first and a second surfaces, and the first foam polymer layer being disposed on the first surface,
   a second foam polymer layer on the second surface of the substrate, and
   a plurality of optical fibers wired between the second surface of the substrate and the second foam polymer layer;
   wherein the first and the second foam polymer layers cover the whole of the first and the second surfaces of the substrate.

10. The optical fiber component according to claim 9, wherein said first foam polymer layer and/or said second polymer layer have an adhesive layer.

11. The optical fiber component according to claim 9, wherein said substrate is a foam polymer.

12. The optical fiber component according to claim 9, wherein a protective layer is disposed on said foam polymer layer.

13. The optical fiber component according to claim 9, wherein said optical fiber component has a portion in which said plurality of optical fibers are crossed and overlapped, and further includes a filler which is selected from the group consisting of a flexible material and an elastic material, wherein said filler fills at least the portion in which said plurality of optical fibers are crossed and overlapped.

14. An optical fiber component consisting of
An optical fiber component consisting of
a substrate having a first surface and a second surface,
a foam polymer layer disposed on the whole of the substrate consisting of the first surface, the second surface and side potions, and
a plurality of optical fibers wired between the first surface of the substrate and the foam polymer layer.

15. The optical fiber component according to claim 14, wherein an said foam polymer layer has an adhesive layer.

16. The optical fiber component according to claim 14, wherein said substrate is a foam polymer.

17. The optical fiber component according to claim 14, wherein a protective layer is disposed on said foam polymer layer.

18. The optical fiber component according to claim 14, wherein said optical fiber component has a portion in which said plurality of optical fibers are crossed and overlapped, and further includes a filler which is selected from the group consisting of a flexible material and an elastic material, wherein said filler fills at least the portion in which said plurality of optical fibers are crossed and overlapped.

* * * * *